(12) United States Patent
Jain et al.

(10) Patent No.: US 12,111,795 B2
(45) Date of Patent: Oct. 8, 2024

(54) EFFICIENT REPLICATION OF FILE CLONES

(71) Applicant: VMware LLC, Palo Alto, CA (US)

(72) Inventors: Abhay Kumar Jain, Cupertino, CA (US); Sriram Patil, San Jose, CA (US); Junlong Gao, Vancouver (CA); Wenguang Wang, Santa Clara, CA (US)

(73) Assignee: VMware LLC, Palo Alto, CA (US)

( * ) Notice: Subject to any disclaimer, the term of this patent is extended or adjusted under 35 U.S.C. 154(b) by 3 days.

(21) Appl. No.: 17/357,044

(22) Filed: Jun. 24, 2021

(65) Prior Publication Data

US 2022/0414064 A1 Dec. 29, 2022

(51) Int. Cl.
| | |
|---|---|
| G06F 7/00 | (2006.01) |
| G06F 16/16 | (2019.01) |
| G06F 16/17 | (2019.01) |
| G06F 16/174 | (2019.01) |
| G06F 16/178 | (2019.01) |
| G06F 16/182 | (2019.01) |

(52) U.S. Cl.
CPC ........ *G06F 16/1844* (2019.01); *G06F 16/164* (2019.01); *G06F 16/1734* (2019.01); *G06F 16/1756* (2019.01); *G06F 16/178* (2019.01)

(58) Field of Classification Search
CPC ............... G06F 16/1844; G06F 16/164; G06F 16/1756; G06F 16/178; G06F 16/1734
USPC ....... 707/634, 639, 654, 664, 692, 703, 609, 707/613, 638, 999.2
See application file for complete search history.

(56) References Cited

U.S. PATENT DOCUMENTS

| | | | |
|---|---|---|---|
| 2013/0198521 A1* | 8/2013 | Wu | H04L 9/3263 713/175 |
| 2017/0192849 A1* | 7/2017 | Xiao | G06F 16/273 |

* cited by examiner

*Primary Examiner* — Md I Uddin
(74) *Attorney, Agent, or Firm* — King Intellectual Asset Management

(57) ABSTRACT

A method for managing replication of cloned files is provided. Embodiments include determining, at a source system, that a first file has been cloned to create a second file. Embodiments include sending, from the source system to a replica system, an address of the first extent and an indication that a status of the first extent has changed from non-cloned to cloned. Embodiments include changing, at the replica system, a status of a second extent associated with a replica of the first file on the replica system from non-cloned to cloned and creating a mapping of the address of the first extent to an address of the second extent on the replica system. Embodiments include creating, at the replica system, a replica of the second file comprising a reference to the address of the second extent on the replica system.

21 Claims, 7 Drawing Sheets

EFFICIENT REPLICATION OF FILE CLONES

BACKGROUND

The amount of data worldwide grows each year, thus requiring more storage resources. Further, protecting the already stored data (e.g., in a datacenter) against disastrous events, such as storage failure or cyber-attacks, which can completely disrupt the business operations, is essential for every enterprise.

Business continuity is one of the primary motivations for utilizing file system replication. Losing access to data for just a few hours can cost businesses thousands of dollars, and recovery from a regular backup can take a couple of hours, so simply using backups for recovery is often not sufficient. As such, a file system may be replicated from a source system to one or more replica systems to ensure continued availability of data.

Certain replication techniques rely on snapshots, which generally capture point-in-time versions of data in a file system. For replication, differences between a current snapshot and a previous snapshot may be used to keep replicas up-to-date by sending only data that has changed to the replica system, thereby avoiding sending an entire snapshot of the file system to the replica system every time a change is made.

In some cases, file clone techniques may be utilized on a source system. A file clone is a writeable, point-in-time, space-efficient copy of an individual file that, when created, refers back to a storage address of the data of the original file of which it is a clone, thereby sharing data blocks with the original file. As the original file and/or the file clone are separately modified, they may be updated to point to separate storage addresses insofar as they contain different data.

Existing replication techniques based on differences between snapshots may not recognize that file clones share data blocks with original files, and so may inefficiently copy all of the data of a file clone to a replica system even though the replica system already contains the data of the original file. Thus, conventional replication techniques may lack efficiency in cases where file clones are utilized. As such, what is needed are improved techniques for efficient replication of file systems containing file clones.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments described herein relate to efficient replication of file systems containing file clones. In particular, as described in more detail below with respect to FIG. 1, a file system may be replicated from a source system to one or more replica systems for improved data availability. When a file clone operation is utilized on the source system to clone an existing file, embodiments of the present disclosure involve particular techniques for efficiently replicating the file system without the need to copy data to a replica system if the data is already present on the replica system (e.g., if the existing file is already present on the replica system). Thus, as described in more detail below with respect to FIGS. 2-7, over-the-wire deduplication techniques may be utilized.

In over-the-wire deduplication, instead of sending data twice, a token representing the data is sent. On the destination, the token can be replaced with appropriate data blocks. If the data corresponding to the token is not available, the destination can request the source side to send the data. Techniques described herein utilize this mechanism for replicating a file clone. For example, when a cloned file or extent is sent from a source system to a replica system, the source physical address is also sent to the replica system. On the replica system, a mapping (source physical address, replica physical address) is created. For subsequent operations, the mapping is used for identifying the replica side physical address corresponding to the source physical address. Thus, the storage-efficient advantages of file clones can be obtained on the replica system and network data transfer can be reduced.

Figure 1:
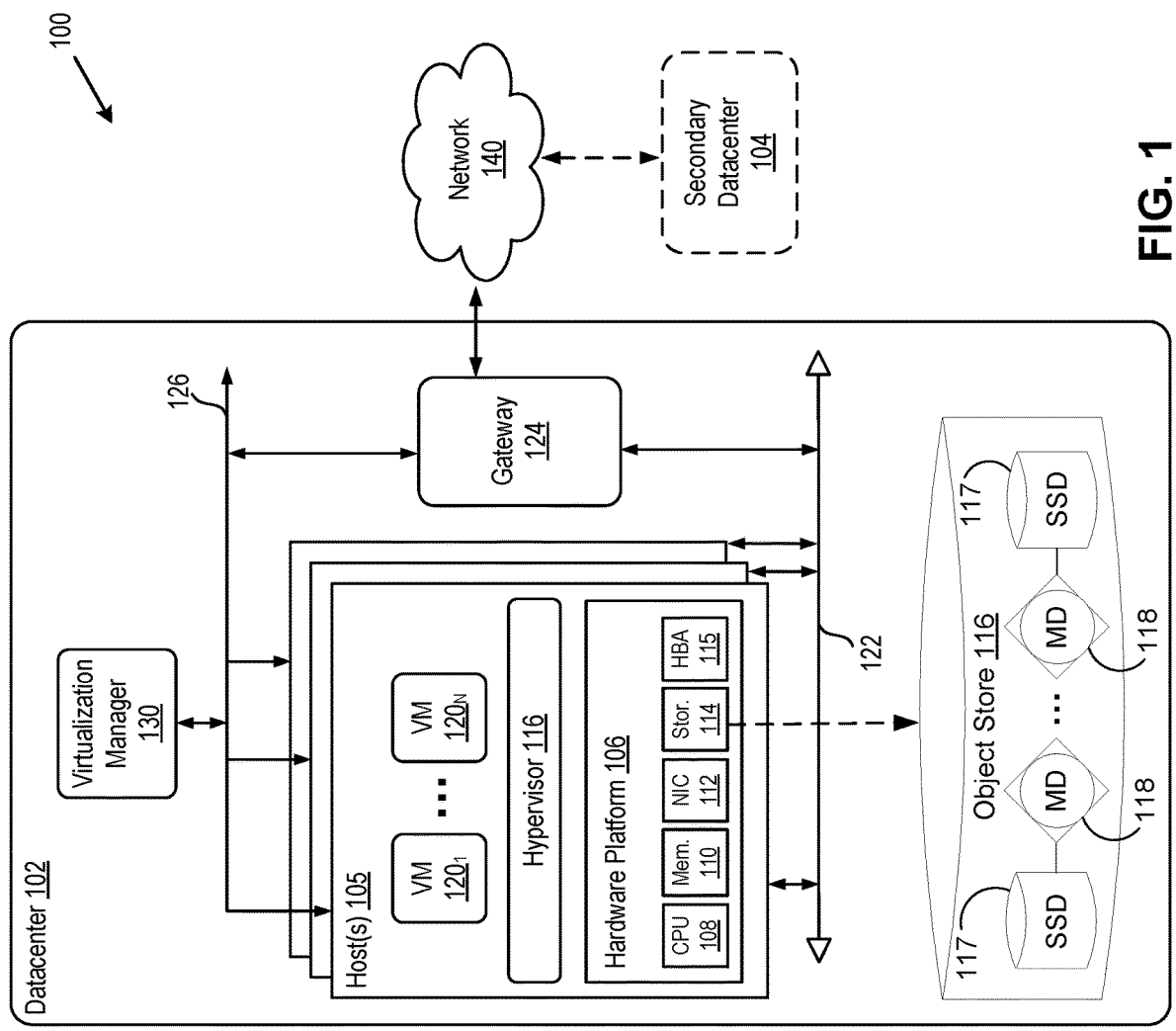
FIG. 1 is a block diagram illustrating a computer system in which one or more embodiments of the present application may be utilized.

FIG. 1 is a block diagram illustrating a computer system 100 in which one or more embodiments of the present application may be utilized. Computer system 100 may include a datacenter 102, a secondary datacenter 104, and a network 140. Network 140 may be, for example, a direct link, a local area network (LAN), a wide area network (WAN), such as the Internet, another type of network, or a combination of one or more of these networks.

Datacenter 102 may include host(s) 105, a virtualization manager 130, a gateway 124, a management network 126, a data network 122, and an object store 116. Networks 122 and 126 may provide Layer 2 or Layer 3 connectivity in accordance with the Open Systems Interconnection (OSI) model, with internal physical or software defined switches and routers not being shown. Although management and data network 126 and 122 are shown as separate physical networks, it is also possible, in some implementations, to logically isolate the management network from the data network, e.g., by using different VLAN identifiers.

Each of hosts 105 may be constructed on a server grade hardware platform 106, such as an x86 architecture platform. For example, hosts 105 may be geographically co-located servers on the same rack. Hardware platform 106 of each host 105 may include components of a computing device such as one or more central processing units (CPUs) 108, system memory 110, a network interface 112, storage system 114, a host bus adapter (HBA) 115, and other I/O devices such as, for example, USB interfaces (not shown). Network interface 112 may enable host 105 to communicate with other devices via a communication medium, such as data network 122 or management network 126. Network interface 112 may include one or more network adapters, also referred to as Network Interface Cards (NICs). In certain embodiments, data network 122 and management network 126 may be different physical networks, as shown, and the hosts 105 may be connected to each of the data network 122 and management network 126 via separate NICs or separate ports on the same NIC. In certain embodiments, data network 122 and management network 126 may correspond to the same physical or software defined network, but different network segments, such as different VLAN segments.

Storage system 114 may represent persistent storage devices (e.g., one or more hard disks, flash memory modules, solid state disks, non-volatile memory express (NVMe) drive, persistent memory devices, and/or optical disks). Storage 114 may be internal to host 105, or may be external to host 105 and shared by a plurality of hosts 105, coupled via HBA 115 or NIC 112, such as over a network. Storage 114 may be a storage area network (SAN) connected to host 105 by way of a distinct storage network (not shown) or via data network 122, e.g., when using iSCSI or FCoE storage protocols. Storage 114 may also be a network-attached storage (NAS) or another network data storage system, which may be accessible via NIC 112.

Local storages 114 housed in, or directly attached to, host machines 105, may provide an aggregate object store 116 for virtual machines (VMs) 120 running on hosts 105. As shown and described, object store 116 may include combinations of solid state drives (SSDs) or non-volatile memory express (NVMe) drives 117, magnetic or spinning disks or slower/cheaper SSDs 118, or other types of storages. The objects stored in object store 116 may include file system objects and other VM related objects, such as virtual disks (VMDKs) of the VMs, etc.

System memory 110 may be hardware allowing information, such as executable instructions, configurations, and other data, to be stored and retrieved. Memory 110 is where programs and data are kept when CPU 108 is actively using them. Memory 110 may be volatile memory or non-volatile memory. Memory 110 may also include a cache that includes cached copies of storage blocks of objects in storage 114 or object store 116. The cached storage blocks in cache may be fetched into memory 110 during different memory operations, such as memory read/write, deduplication, etc.

A file system may be used to enable applications operating on hosts 105 (e.g., on hosts 105 directly, or on VMs 120 operating on hosts 105) to interact with data stored in storage system 114 and/or other storage resources such as provided by cloud computing system. One of a variety of file systems may be used for this purpose. One example is a virtual distributed file system (VDFS), which is a hyper-converged distributed portable operating system interface (PO SIX) file system. VDFS refers to an interface between the computation layer (e.g., applications operating on hosts 105) and storage system 114. More specifically, VDFS has two sets of APIs, Southbound APIs (SAPIs) and Northbound APIs (NAPIs). SAPIs enable VDFS to connect with storage system 114, while NAPIs expose different APIs for applications operating on hosts 105 to be able to interact with data store in storage system 114 through VDFS. Note that VDFS is only one example of a file system that can be used to manage data storage in the storage resources provided by an on-premise data center 102 and/or a cloud computing system (not shown).

Host 105 may be configured to provide a virtualization layer, also referred to as a hypervisor 116, that abstracts processor, memory, storage, and networking resources of hardware platform 106 into multiple virtual machines 1201 to 120N (collectively referred to as VMs 120 and individually referred to as VM 120) that run concurrently on the same host. Hypervisor 116 may run on top of the operating system in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In some implementations, the hypervisor may comprise system level software as well as a "Domain 0" or "Root Partition" virtual machine (not shown) which is a privileged virtual machine that has access to the physical hardware resources of the host and interfaces directly with physical I/O devices using device drivers that reside in the privileged virtual machine.

It should be noted that although the disclosure is described with reference to VMs, the embodiments described herein also apply to other types of virtual computing instances (VCIs), such as containers, Docker containers, data compute nodes, isolated user space instances, namespace containers, and the like. In certain embodiments, instead of VMs 120, the techniques may be performed using containers that run on host 105 without the use of a hypervisor and without the use of a separate guest operating system running on each container. In certain embodiments, the techniques may be performed directly on physical computing devices, such as hosts 105, that may or may not run VCIs. Accordingly, each of a source system and a destination system may be a physical computing device or a VCI.

Virtualization manager 130 may communicate with hosts 105 via a network, shown as a management network 126, and carries out administrative tasks for data center 102 such as managing hosts 105, managing VMs 120 running within each host 105, provisioning VMs, migrating VMs from one host to another host, and load balancing between hosts 105. Virtualization manager 130 may be a computer program that resides and executes in a central server in data center 102 or, alternatively, virtualization manager 130 may run as a virtual computing instance (e.g., a VM) in one of hosts 105. Although shown as a single unit, virtualization manager 130 may be implemented as a distributed or clustered system. That is, virtualization manager 130 may include multiple servers or virtual computing instances that implement management plane functions.

Although hosts 105 are shown as comprising a hypervisor 116 and virtual machines 120, in an embodiment, hosts 105 may comprise a standard operating system instead of a hypervisor 116, and hosts 105 may not comprise VMs 120. In this embodiment, data center 102 may not comprise virtualization manager 130.

Gateway 124 may provide hosts 105, VMs 120, and other components in data center 102 with connectivity to one or more networks used to communicate with one or more remote datacenters and/or other devices/servers, such as secondary datacenter 104, etc., for example, through network 140. Gateway 124 may manage external public Internet Protocol (IP) addresses for VMs 120 and route traffic incoming to and outgoing from data center 102 and provide networking services, such as firewalls, network address translation (NAT), dynamic host configuration protocol (DHCP), and load balancing. Gateway 124 may use data network 122 to transmit data network packets to hosts 105. Gateway 124 may be a virtual appliance, a physical device, or a software module running within host 105.

Object store 116 may store data separately from the metadata. For example, a vSAN datastore may store data associated with an object (e.g., a VM disk) in an object storage (e.g., an SSD 117) and store the metadata associated with the stored object in a separate metadata storage (e.g., MD storage 118). The metadata may include one or more of, but is not limited to, objects identifiers (IDs), logical block addresses where each object is stored, a hash of each block, chunk IDs and their corresponding offsets, or the like. The metadata may be read/written concurrently from/to one or more key-value data structures by one or more compute nodes (e.g., may also be referred to as readers and/or writers) to allow for scalable I/O operations.

In some embodiments, each object may be stored in fixed block sizes of data (e.g., each block being approximately 4 kilobyte (KB)) in one or more segments that have fixed segment sizes (e.g., approximately 4 megabyte (MB) for each segment). Each fixed block size may also be called a chunk of data or simply a chunk in some embodiments. It should be noted that when files are stored, the blocks may have different sizes (e.g., that are defined on a byte-boundary basis using, for example, robin hash fingerprints).

In an example, a file system object (e.g., a metadata object of a disk of a VM 120) in object store 116 is replicated across a set of hosts 105 and/or hosts on secondary datacenter 104. For example, redundant array of independent disks (RAID) techniques may be utilized, which generally entail creating one or more replicas of a file system one or more hosts separate from the host on which the original file system resides. These techniques ensure that at least a second copy of a file system object is still available if a first copy is lost due to some sort of failure (e.g. disk failure etc.). In some embodiments, some objects may require a more robust fault tolerance system (e.g., depending on their level of importance). For example, in one embodiment, the vSAN datastore may store a file system object in a three-way mirror format (e.g., on at least three different disks).

In some cases, differences between snapshots of a file system are used to efficiently replicate the file system from a source system (e.g., a first host 105, first VCI 120, etc.) and a given replica system (e.g., a different host 105 or a host on remote datacenter 104, a difference VCI 120, etc.). For example, snapshots (e.g., backups, delta backups containing only changed data since a previous backup, etc.) of the file system may be taken at different points of time. In some embodiments, the first snapshot of the file system may be sent in its entirety to the given replica system, and subsequently only the snapshot differences (which may also be referred to as "snapshot cliffs", or "diffs") are sent to the given replica system. Additionally, information (e.g., metadata) associated with the file system, such as object ID, snapshot ID, logical block addresses (LBAs) in which the object is stored, and/or the like, may also be sent to the given replica system. In some embodiments, data and metadata associated with the file system are also sent to one or more remote data storage entities (e.g., cloud storage devices) where they can be accessed, for example, by remote data center 104.

A file clone operation may be performed within a file system in object store 116. A file clone provides a quick and efficient way to make a copy of a file by simply copying the metadata corresponding to the file and using reference counting to manage the life cycle of underlying blocks. With existing replication techniques, for a snapshot diff, a newly added clone will simply appear as new file addition, and will result in duplicate transferring and storing at the replica site. Accordingly, techniques described herein involve replicating snapshots and file clones in an efficient manner with respect to network and storage resources.

An extent refers to a continuous set of blocks at a data storage location, and a file may be made up of a plurality of extents, which may be continuous with one another in storage or located separately. Because file clones typically use reference counts to manage the life cycle of the cloned extent (set of blocks), when a file is cloned, all of its extents will have 1 additional reference. Similarly, when a cloned file gets overwritten or deleted, the reference count for corresponding extents will be reduced by 1. If the reference count for an extent drops to zero, the extent can be reclaimed. According to techniques described herein, the source-side extent address is used as a token for the cloned extent, and this token is sent from a source system to a replica system instead of the data. If the data has already been sent to the replica system, the replica system can look up the data corresponding to the token and use that data for the cloned file. If the data corresponding to the token is not available, the replica system can request the source system to send the data.

According to certain embodiments, each extent is marked as cloned or non-cloned. For a non-cloned extent, a replication agent on the source system will simply send data and extent info to a replica system. When an extent is cloned, its status changes from non-cloned to cloned. When an extent's status changes from non-cloned to cloned, this status change will appear in a snapshot diff. The replication agent will detect this change and send an extent update message containing the source-side address and the extent status change to the replica system. The source-side extent address acts as a token and, on receiving the update message, a replication agent on the replica system will create a mapping (source physical address, replica physical address) for the cloned extents. For the cloned file, the replication agent on the source system will only need to send the source-side extent address, and the replication agent on the replica system will replace the token with the actual replica-side address by utilizing the mapping table created in the earlier step.

Efficient replication of file clones is illustrated in more detail with respect to examples described below with respect to FIGS. 2-6. Each of FIGS. 2-6 may represent a set of operations performed after a respective snapshot of a file system is taken. In FIGS. 2-6, existing metadata entries are depicted with a solid border, newly added entries are depicted with a dotted border, modified entries are depicted with a dashed border, and deleted entries are depicted with a border containing alternating dots and dashes.

Figure 2:
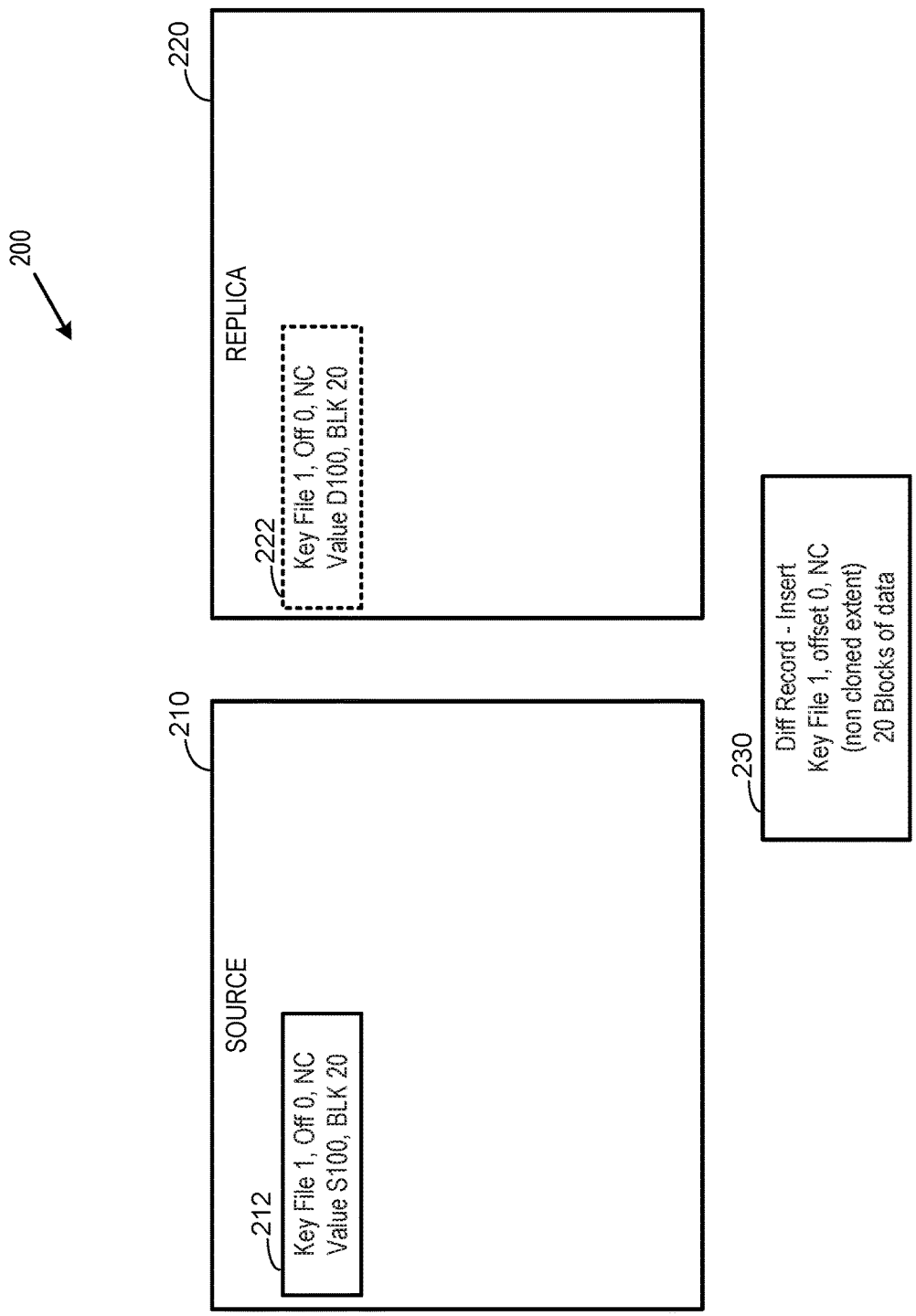
FIG. 2 is a block diagram illustrating an example related to efficient replication of file clones.

FIG. 2 is a block diagram 200 illustrating an example related to efficient replication of file clones. Block diagram 200 comprises a source system 210 and a replica system 220 in a storage replication environment, such as a disk of a VM 120 of FIG. 1 with a RAID configuration. For example, source system 210 may be a host 105 of FIG. 1 and replica system 220 may be a different host 105 of FIG. 1 or a host on remote datacenter 104 of FIG. 1. For instance, source system 210 and replica system 220 may belong to a cluster of hosts across which a file system is replicated. While one replica system 220 is shown, one or more additional replica systems may also be included in the cluster, and similar operations to those described with respect to FIGS. 2-6 may also be performed with respect to the additional replica systems.

In block diagram 200, a file (file 1) on source system 210 is replicated to replica system 220, such as based on a snapshot of a file system that includes the file. Entry 212 represents an entry in a metadata structure such as a B tree or B+ tree, and comprises a key and a value. The key of entry 212 comprises a file identifier (file 1), an offset (0), and a status indicating that the extent referenced by the entry is not cloned (NC). The value of entry 212 comprises an address (S100) of an extent on source system 210 corresponding to the file and a number of blocks (20) that, beginning at the address, correspond to the file.

In order to replicate file 1, an update message 230 is sent (e.g., by a replication agent on source system 210) to replica system 220. Update message 230 comprises a diff record (e.g., a difference between a current snapshot and a previous snapshot in which file was not present) indicating that file 1 was inserted. Update message 230 comprises a key (file 1, offset 0, NC) and an indication of 20 blocks of data.

In response to update message 230, replica system 220 creates a new entry 222 in a metadata structure on replica system 220. The key of entry 222 comprises a file identifier (file 1), an offset (0), and a status indicating that the extent referenced by the entry is not cloned (NC). The value of entry 222 comprises an address (D100) of an extent on replica system 220 corresponding to the file and a number of blocks (20) that, beginning at the address, correspond to the file.

In the example depicted in block diagram 200, file 1 has not yet been cloned. As such, the statuses of the extents corresponding to file 1 on both source system 210 and replica system 220 are set to non-cloned. Replication of a cloned file is described below with respect to additional examples depicted in FIGS. 3-6.

Figure 3:
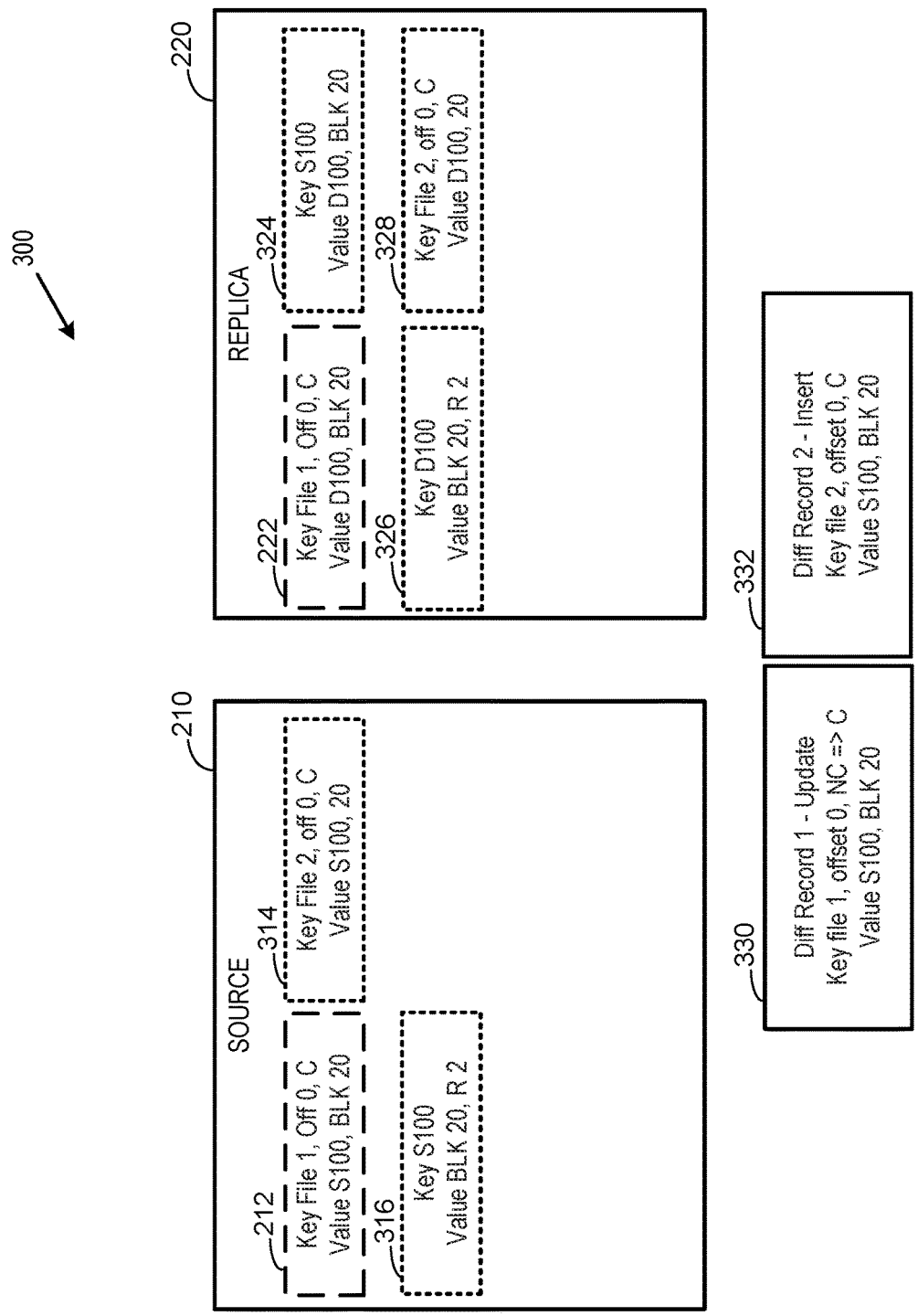
FIG. 3 is a block diagram illustrating another example related to efficient replication of file clones.

FIG. 3 is a block diagram 300 illustrating another example related to efficient replication of file clones. Block diagram 300 comprises source system 210, replica system 220, and entries 212 and 222 of FIG. 2.

In block diagram 300, file 1 is cloned to create file 2. For example, a file clone operation may be used to create file 2 as a space-efficient copy of file 1 that refers back to a storage address of the data of file 1, thereby sharing data blocks with the file 1. Copy on write (COW) techniques may be used for the file clone such that file 1 and file 2 continue to point to the same storage blocks to the extent that they remain un-modified after the clone operation. When a portion of file 1 or file 2 is modified, a separate copy of that portion of the file may be created at a different storage location.

In response to the cloning of file 1 to create file 2, source system 210 modifies entry 212 to reflect that the status of the extent referenced by the entry has changed from non-cloned to cloned (C). Source system 210 further creates a new entry 314 for file 2. The key of entry 314 comprises a file identifier (file 2), an offset (0), and a status indicating that the extent referenced by the entry is cloned (C). The value of entry 314 comprises an address (S100) of the extent on source system 210 corresponding to the file (which is the same extent referenced by file 1) and a number of blocks (20) that, beginning at the address, correspond to the file. Additionally, entry 316 is created on source system 210 to maintain a reference count for the extent referenced by file 1 and file 2. The key of entry 316 comprises the address of the extent (S100). The value of entry 316 comprises a number of blocks (20) and a reference count (2). The reference count of the 20-block extent beginning at address S100 is 2 because the extent is referenced by both file 1 and file 2.

In order to replicate the changes at source system 210, two update messages 330 and 332 are sent from source system 210 to replica system 220.

Update message 330 comprises a diff record (e.g., a difference between a current snapshot and the previous snapshot described above with respect to FIG. 2) indicating that a status of the 20-block extent at address S100 has been updated from non-cloned to cloned. Update message 330 comprises a key (file 1, offset 0, NC=>C indicating a change from non-cloned to cloned) and an indication of the address of the extent (S100) and 20 blocks of data.

Update message 332 comprises another diff record indicating that file 2 was inserted. Update message 332 comprises a key (file 2, offset 0, C) and an indication of the address of the extent (S100) on source system 210 and 20 blocks of data.

In response to update message 330, replica system 220 modifies entry 222 by changing the status of the extent at D100 from non-cloned to cloned. Furthermore, based on update message 332, replica system 220 adds a new entry 324 comprising a mapping between the address (S100) of the extent associated with file 1 on source system 210 and the address (D100) of the extent associated with file 1 on replica system 220. The key of entry 324 comprises the address (S100) of the extent on source system 210 and the value of entry 324 comprises the address (D100) of the extent on replica system 220 and a number of blocks (20) of the extent on replica system 220. In some embodiments, mapping entries such as entry 324 are stored in a different metadata structure than the other entries.

In response to update message 332, replica system 220 creates new entries 326 and 328. Entry 326 maintains a reference count of the 20-block extent at address D100. The key of entry 326 comprises the extent address (D100) and the value of entry 326 comprises a number of blocks (20) and a reference count (2). The reference count of the 20-block extent beginning at address D100 is 2 because the extent is referenced by both file 1 and file 2.

Entry 328 is also created for file 2. The key of entry 328 comprises a file identifier (file 2), an offset (0), and a status indicating that the extent referenced by the entry is cloned (C). The value of entry 328 comprises an address (D100) of the extent on replica system 220 corresponding to the file (which is the same extent referenced by file 1) and a number of blocks (20) that, beginning at the address, correspond to the file.

By storing the mapping in entry 324 on replica system 220, the source-side extent address (S100) can be used as a token for sending updates relating to the cloned extent from source system 210 to replica system 220, and replica system 220 can use the mapping to determine the replica-side extent address (D100) to which the updates relate. Thus, when replica system 220 receives update message 332, which includes the source-side extent address S100, replica system 220 is able to determine based on the mapping in entry 324 that the cloned file (file 2) should reference the replica-side extent address D100. Accordingly, the data for file 2 does not need to be separately transmitted from source system 210 to replica system 220, as it is already present on replica system 220 in the extent associated with file 1. Techniques described herein, therefore, allow for file clones to be replicated in a resource-efficient manner by not requiring separate transmission and storage of data associated with a cloned file on a replica system. In some cases, if the data corresponding to the token (e.g., S100) is unavailable (e.g., if replica system 220 did not have data stored at address D100 or did not have a mapping between S100 and a replica-side address), replica system 220 can request source system 210 to send the data.|

Furthermore, by storing reference counts for cloned extents on both source system 210 and replica system 220, techniques described herein allow the usage of data in particular extents to be tracked so that, for example, if the reference count of an extent reduces to zero, the extent can be reclaimed (e.g., the data may be deleted and/or the blocks may be freed for other purposes).

Figure 4:
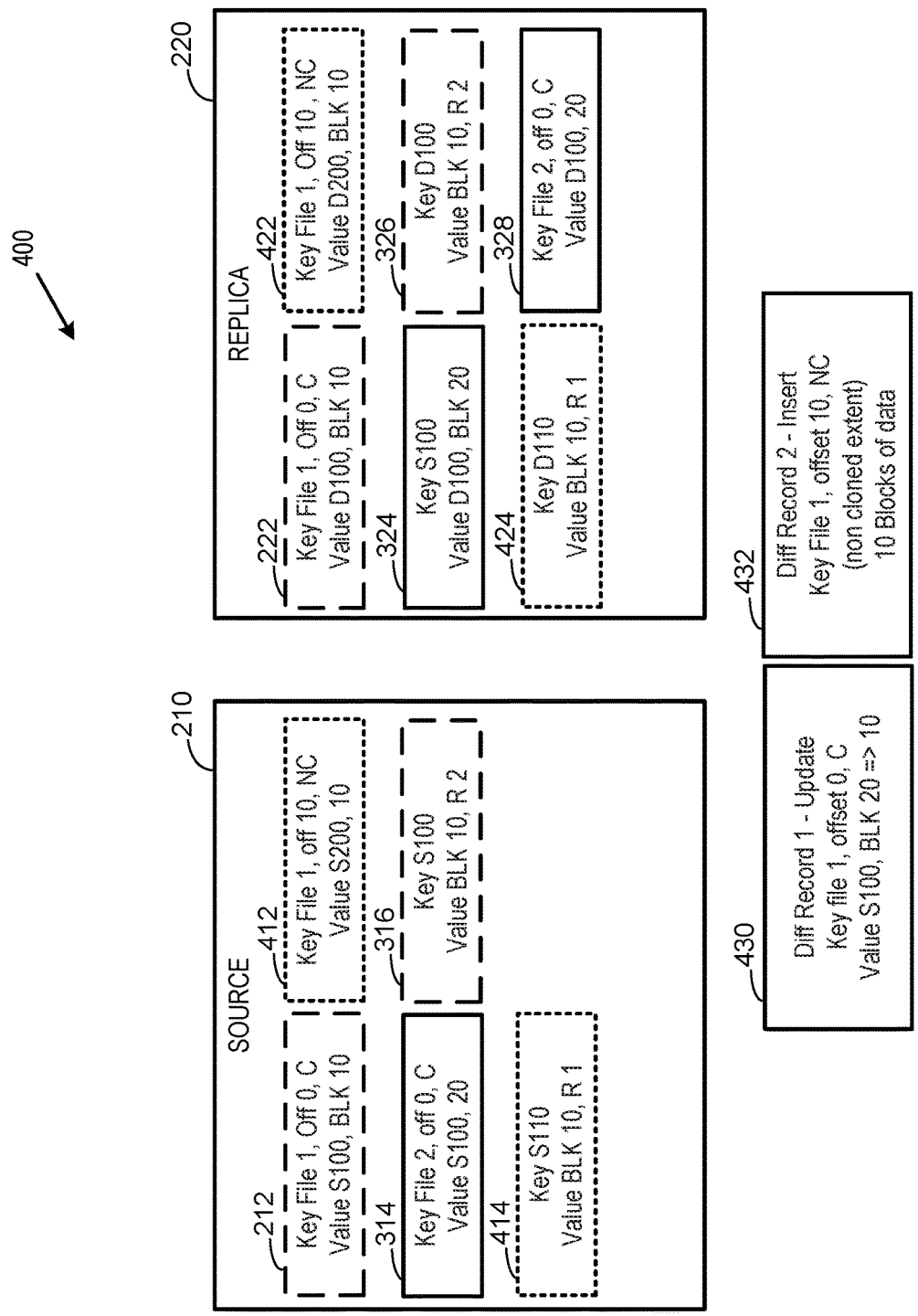
FIG. 4 is a block diagram illustrating another example related to efficient replication of file clones.

FIG. 4 is a block diagram 400 illustrating another example related to efficient replication of file clones. Block diagram 400 comprises source system 210, replica system 220, and entries 212, 222, 314, 316, 324, 326, and 328 of FIG. 3.

In block diagram 400, file 1 modifies 10 blocks at offset 10 (e.g., the last 10 blocks of the file). On source system 210, this results in the creation of a new entry for the modified blocks, splitting the reference count entry into two different ranges (S100, 10, R2) and (S110, 10, R1).

In particular, source system 210 modifies entry 212 to reduce the number of blocks from 20 to 10, as file 1 is now split between two separate 10-block entries. Source system 210 also creates new entry 412 for the modified portion of file 1. The key of entry 412 comprises a file identifier (file 1), an offset (10), and a status indicating that the extent referenced by the entry is non-cloned (NC). The value of entry 412 comprises an address (S200) of the extent on source system 210 corresponding to the portion of the file and a number of blocks (10) that, beginning at the address, correspond to the portion of the file.

Source system 210 further modifies entry 316 to indicate that the reference count only applies to 10 blocks (rather than 20 blocks, as was the case prior to the modification of the portion of file 1) beginning at address S100. Source system 210 creates a new entry 414 to maintain a reference count for the second portion of file 1. The key of entry 414 comprises the address of the extent (S110). The value of entry 414 comprises a number of blocks (10) and a reference count (1).

In order to replicate the changes at source system 210, two update messages 430 and 432 are sent from source system 210 to replica system 220.

Update message 430 comprises a diff record (e.g., a difference between a current snapshot and the previous snapshot described above with respect to FIG. 3) indicating that the extent at address S100 associated with file 1 has been updated to include 10 blocks rather than 20 blocks. Update message 430 comprises a key (file 1, offset 0, C) and an indication of the address of the extent (S100) and a change from 20 blocks of data to 10 blocks of data.

Update message 432 comprises another diff record indicating that a new entry for the modified portion of file 1 was inserted. Update message 432 comprises a key (file 1, offset 10, NC) and an indication of 10 blocks of data.

In response to update messages 430 and 432, replica system 220 modifies entry 222 by changing the number of blocks from 20 to 10. For example, replica system 220 may use the mapping in entry 324 to determine that update message 430 relates to the extent at address D100. Furthermore, replica system 220 adds a new entry 422 for the modified portion of file 1. The key of entry 422 comprises a file identifier (file 1), an offset (10), and a status indicating that the extent referenced by the entry is non-cloned (NC). The value of entry 422 comprises an address (D200) of the extent on replica system 220 corresponding to the portion of the file and a number of blocks (10) that, beginning at the address, correspond to the portion of the file.

Replica system 220 further modifies entry 326 to indicate that the reference count only applies to 10 blocks (rather than 20 blocks, as was the case prior to the modification of the portion of file 1) beginning at address D100. Replica system 220 creates a new entry 424 to maintain a reference count for the second portion of file 1. The key of entry 424 comprises the address of the extent (D110). The value of entry 424 comprises a number of blocks (10) and a reference count (1).

Because the second portion of file 1 has not yet been cloned, there is no need yet for replica system 220 to store a mapping between the source-side extent address for the second portion of file 1 (S200) and the replica-side extent address of the second portion of file 1 (D200).

Figure 5:
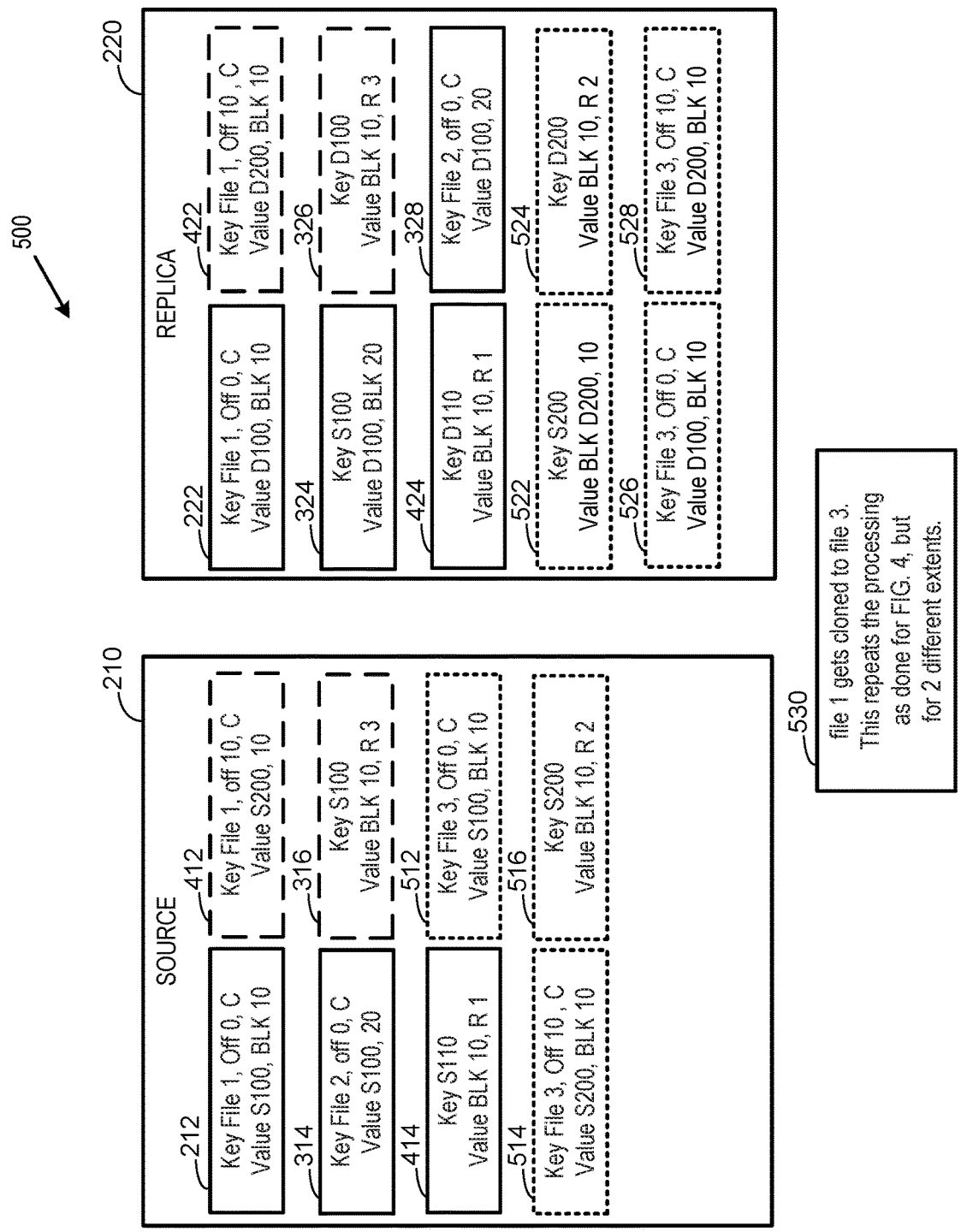
FIG. 5 is a block diagram illustrating another example related to efficient replication of file clones.

FIG. 5 is a block diagram 500 illustrating another example related to efficient replication of file clones. Block diagram 500 comprises source system 210, replica system 220, and entries 212, 222, 314, 316, 324, 326, 328, 412, 414, 422, and 424 of FIG. 4.

In block diagram 500, file 1 is cloned again to create file 3. This causes the processing described above with respect to FIG. 3 to be performed again, only this time with 2 different extents.

In particular, source system 210 modifies entry 412 to indicate that the status of the 10-block extent beginning at address S200 has changed from non-cloned to cloned. Source system 210 also modifies entry 316 to set the reference count for the 10-block extent beginning at address S100 to 3 (as this extent is now referenced by file 1, file 2, and file 3).

Source system creates new entry 512 for a first portion of file 3. The key of entry 512 comprises a file identifier (file 3), an offset (0), and a status indicating that the extent referenced by the entry is cloned (C). The value of entry 512 comprises an address (S100) of the extent on source system 210 corresponding to the first portion of file 3 (which is the same extent referenced by the first portion of file 1) and a number of blocks (10) that, beginning at the address, correspond to the first portion of file 3. Source system 210 also creates new entry 514 for a second portion of file 3. The key of entry 514 comprises a file identifier (file 3), an offset (10), and a status indicating that the extent referenced by the entry is cloned (C). The value of entry 514 comprises an address (S200) of the extent on source system 210 corresponding to the second portion of file 3 (which is the same extent referenced by the second portion of file 1) and a number of blocks (10) that, beginning at the address, correspond to the second portion of file 3.

Additionally, entry 516 is created on source system 210 to maintain a reference count for the extent referenced by the second portions of file 1 and file 3. The key of entry 516 comprises the address of the extent (S200). The value of entry 516 comprises a number of blocks (10) and a reference count (2). The reference count of the 10-block extent beginning at address S200 is 2 because the extent is referenced by both the second portion of file 1 and the second portion of file 3.

In order to replicate the changes at source system 210, an update message 530 is sent from source system 210 to replica system 220. Update message 530 may represent one or more update messages comprising one or more diff records (e.g., indicating differences between a current snapshot and the previous snapshot described above with respect to FIG. 4), similar to those described above with respect to FIG. 3, only for 2 extents rather than 1.

In response to update message 530, replica system 220 modifies entry 422 to indicate that the status of the 10-block extent beginning at address D200 has changed from non-cloned to cloned. Furthermore, replica system 220 modifies entry 326 to increase the reference count for the 10-block extent beginning at the address D100 to 3.

Replica system 220 adds a new entry 522 comprising a mapping between the address (S200) of the extent associated with second portions of file 1 and file 3 on source system 210 and the address (D200) of the extent associated with second portions of file 1 and file 3 on replica system 220. The key of entry 522 comprises the address (S200) of the extent on source system 210 and the value of entry 324 comprises the address (D200) of the extent on replica system 220 and a number of blocks (10) of the extent on replica system 220.

Replica system 220 also adds a new entry 524 to maintain a reference count of the 10-block extent beginning at address D200. The key of entry 524 comprises the address of the extent (D200). The value of entry 524 comprises a number of blocks (10) and a reference count (2). The reference count of the 10-block extent beginning at address D200 is 2 because the extent is referenced by both the second portion of file 1 and the second portion of file 3.

Replica system 220 also creates a new entry 526 for the first portion of file 3. The key of entry 526 comprises a file identifier (file 3), an offset (0), and a status indicating that the extent referenced by the entry is cloned (C). The value of entry 526 comprises an address (D100) of the extent on replica system 220 corresponding to the first portion of file 3 (which is the same extent referenced by the first portion of file 1) and a number of blocks (10) that, beginning at the address, correspond to the first portion of file 3. Replica system 220 also creates new entry 528 for the second portion of file 3. The key of entry 528 comprises a file identifier (file 3), an offset (10), and a status indicating that the extent referenced by the entry is cloned (C). The value of entry 528 comprises an address (D200) of the extent on replica system 220 corresponding to the second portion of file 3 (which is the same extent referenced by the second portion of file 1) and a number of blocks (10) that, beginning at the address, correspond to the second portion of file 3.

By storing the mapping in entry 522 on replica system 220, the source-side extent address (S200) can be used as a token for sending updates relating to the cloned extent from source system 210 to replica system 220, and replica system 220 can use the mapping to determine the replica-side extent address (D200) to which the updates relate. Thus, when replica system 220 receives update messages for the creation of file 3 that include the source-side extent addresses S100 and S200, replica system 220 is able to determine based on the mappings in entries 324 and 522 that the cloned file (file 3) should reference the replica-side extent addresses D100 and D200.

Figure 6:
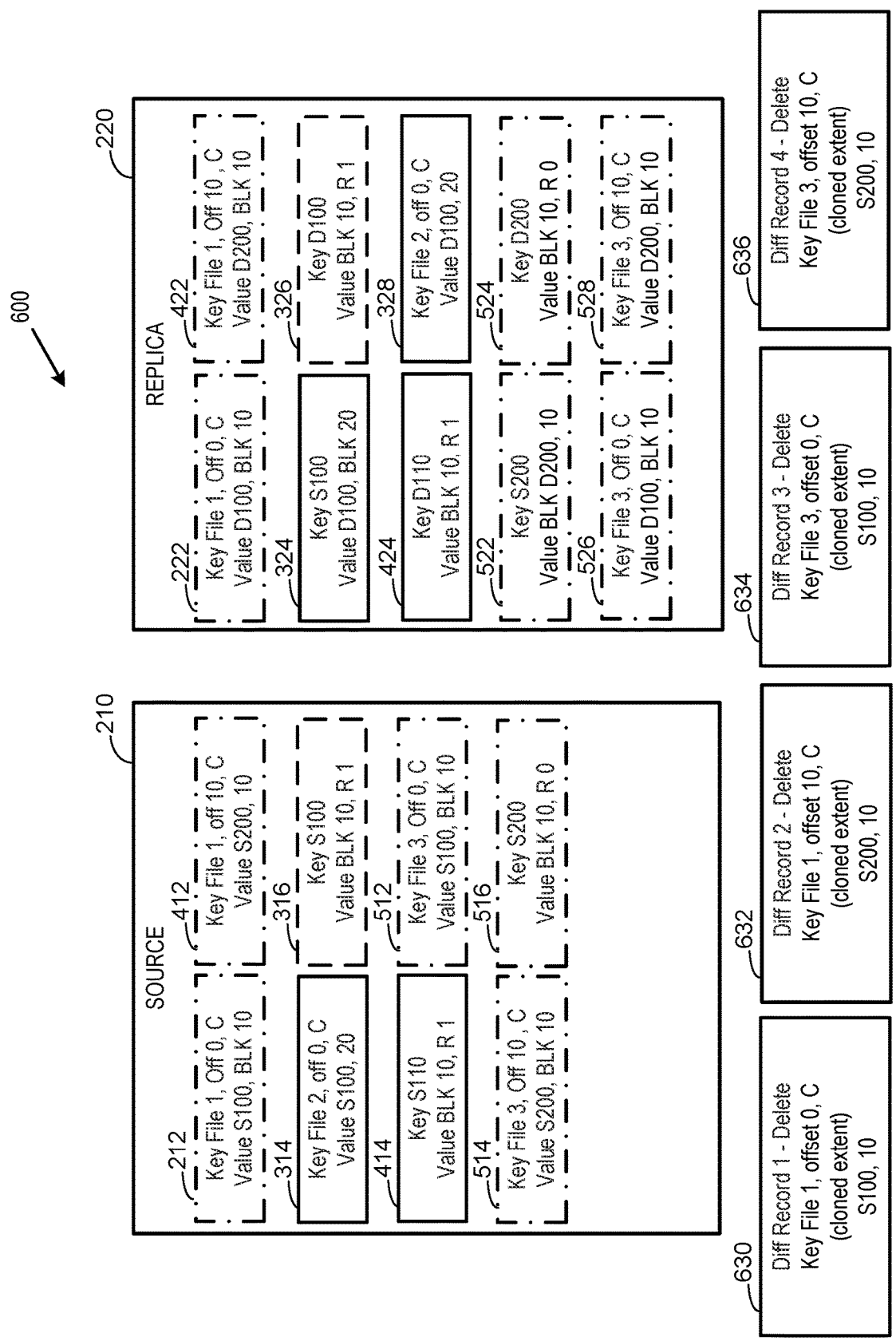
FIG. 6 is a block diagram illustrating another example related to efficient replication of file clones.

FIG. 6 is a block diagram 600 illustrating another example related to efficient replication of file clones. Block diagram 600 comprises source system 210, replica system 220, and entries 212, 222, 314, 316, 324, 326, 328, 412, 414, 422, 424, 512, 514, 516, 522, 524, 526, and 528 of FIG. 5.

In block diagram 600, file 1 and file 3 are deleted at source system 210. This results in the deletion of entries on source system 210 and, based on update messages, the deletion of corresponding entries on replica system 220.

In particular, source system 210 deletes entries 212 and 412 for file 1 and deletes entries 512 and 516 for file 3. Source system 210 modifies entry 316 to set the reference count for the 10-block extent beginning at address S100 to 1 (as this extent is now only referenced by file 2). Furthermore, source system 210 modifies entry 516 to set the reference count for the 10-block extent beginning at address S200 to 0 and, upon determining that the reference count is 0, deletes entry 516.

In order to replicate the changes at source system 210, update messages 630, 632, 634, and 636 are sent from source system 210 to replica system 220. Update message 630 indicates that the entry for the first portion of file 1 was deleted and update message 632 indicates that the entry for the second portion of file 1 was deleted. Similarly, update message 634 indicates that the entry for the first portion of file 3 was deleted and update message 636 indicates that the entry for the second portion of file 3 was deleted.

In response to update messages 630, 632, 634, and 636, replica system 220 deletes entries 222 and 422 for file 1 and deletes entries 526 and 528 for file 3 (e.g., using the mappings in entries 324 and 522 to determine the replica-side extent addresses to which the update messages relate based on the source-side extent addresses included in the update messages). Replica system 220 modifies entry 326 to set the reference count for the 10-block extent beginning at address D100 to 1 (as this extent is now only referenced by file 2). Furthermore, replica system 220 modifies entry 524 to set the reference count for the 10-block extent beginning at address D200 to 0 and, upon determining that the reference count is 0, deletes entry 524. Upon determining that the reference count for the 10-block extent beginning at address D200 is 0, replica system 220 may reclaim the extent. Finally, replica system 220 deletes entry 522, as the mapping between source address S200 and replica address D200 is no longer needed in view of the deletion of files 1 and 3.

Figure 7:
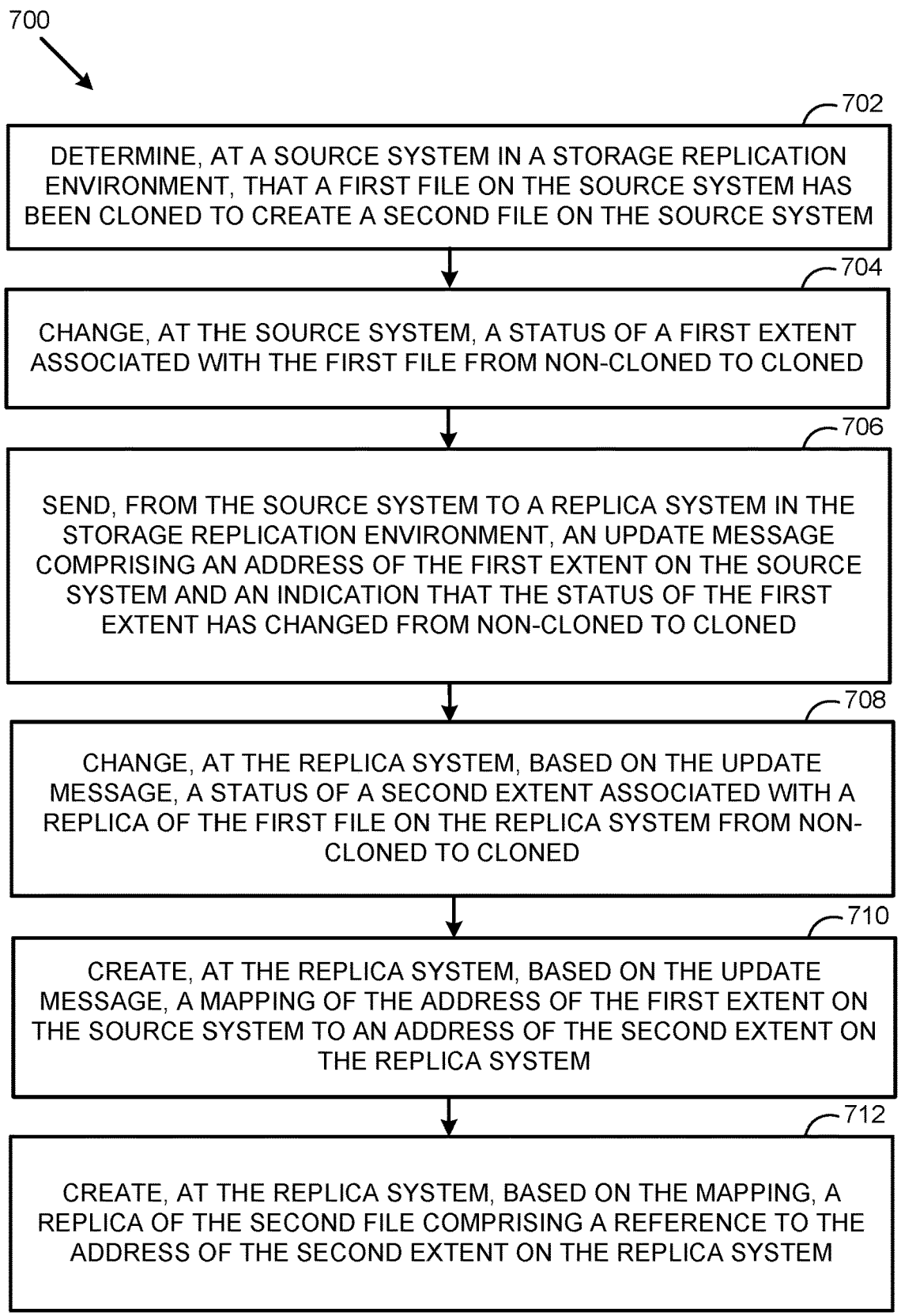
FIG. 7 illustrates example operations related to efficient replication of file clones.

FIG. 7 depicts example operations 700 related to efficient replication of file clones. For example, operations 700 may be performed by one or more components of source system 210 and/or replica system 220 of FIGS. 2-6.

Operations 700 begin at step 702, with determining, at a source system in a storage replication environment, that a first file on the source system has been cloned to create a second file on the source system.

Operations 700 continue at step 704, with changing, at the source system, a status of a first extent associated with the first file from non-cloned to cloned.

Operations 700 continue at step 706, with sending, from the source system to a replica system in the storage replication environment, an update message comprising an address of the first extent on the source system and an indication that the status of the first extent has changed from non-cloned to cloned.

Operations 700 continue at step 708, with changing, at the replica system, based on the update message, a status of a second extent associated with a replica of the first file on the replica system from non-cloned to cloned.

Operations 700 continue at step 710, with creating, at the replica system, based on the update message, a mapping of the address of the first extent on the source system to an address of the second extent on the replica system.

Operations 700 continue at step 704, with creating, at the replica system, based on the mapping, a replica of the second file comprising a reference to the address of the second extent on the replica system.

Certain embodiments further involve setting, at the source system, based on the second file being created, a reference count associated with the first extent to two, and setting, at the replica system, based on the replica of the second file being created, a reference count associated with the second extent to two. Furthermore, some embodiments include determining, at the source system, that a portion of the first file has been modified, wherein the portion of the first file begins at a given block offset, assigning, at the source system, a separate extent on the source system to the portion of the first file, and updating, at the source system, metadata associated with the first file to indicate that an initial portion of the first file is associated with the address of the first extent up to the given block offset and that the portion of the first file is associated with an address of the separate extent.

Some embodiments further include sending, from the source system to the replica system, an additional update message based on the portion of the first file being modified, assigning, at the replica system, based on the additional update message, an additional extent on the replica system to a portion of the replica of the first file that corresponds to the portion of the first file, and updating, at the replica system, metadata associated with the replica of the first file to indicate that an initial portion of the replica of the first file is associated with the address of the second extent up to the given block offset and that the portion of the replica of the first file is associated with an address of the additional extent.

Certain embodiments further include setting, at the source system, a reference count associated with a portion of the first extent beginning at the given offset to one and setting, at the source system, a reference count associated with the separate extent to one.

Some embodiments further comprise setting, at the replica system, a reference count associated with a portion of the second extent beginning at the given offset to one and setting, at the replica system, a reference count associated with the additional extent to one.

Furthermore, certain embodiments include determining, at the source system, that the first file has been deleted, changing, at the source system, the status of the first extent from cloned to non-cloned, sending, from the source system to the replica system, an additional update message comprising an address of the first extent on the source system and an indication that the status of the first extent has changed from cloned to non-cloned, changing, at the replica system, based on the additional update message, the status of the second extent from cloned to non-cloned, and deleting, at the replica system, the replica of the first file.

Notably, operations 700 are included as an example, and other operations are possible.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory, persistent memory, solid state disk (e.g., a flash memory device), NVMe device, a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method comprising:
   determining, at a source system in a storage replication environment, that a first file on the source system has been cloned to create a second file on the source system;
   changing, at the source system, a status of a first extent associated with the first file from non-cloned to cloned;
   sending, from the source system to a replica system in the storage replication environment, an update message comprising an address of the first extent on the source system and an indication that the status of the first extent has changed from non-cloned to cloned, the address of the first extent acting as a token;
   changing, at the replica system, based on the update message, a status of a second extent associated with a replica of the first file on the replica system from non-cloned to cloned;
   creating, at the replica system, based on the update message, a mapping of the address of the first extent on the source system to an address of the second extent on the replica system;
   replacing the token with the address of the second extent utilizing the mapping;
   creating, at the replica system, based on the mapping, a replica of the second file comprising a reference to the address of the second extent on the replica system;
   determining, at the source system, that a portion of the first file has been modified, wherein the portion of the first file begins at a given block offset;
   assigning, at the source system, a separate extent on the source system to the portion of the first file; and
   updating, at the source system, metadata associated with the first file to indicate that an initial portion of the first file is associated with the address of the first extent up to the given block offset and that the portion of the first file is associated with an address of the separate extent.

2. The method of claim 1, further comprising:
   setting, at the source system, based on the second file being created, a reference count associated with the first extent to two; and
   setting, at the replica system, based on the replica of the second file being created, a reference count associated with the second extent to two.

3. The method of claim 1, wherein:
   the address of the first extent comprises a storage address of the first extent on the source system corresponding to a location of the first file; and
   the address of the second extent comprises a storage address of the second extent on the replica system corresponding to a location of the replica of the first file.

4. The method of claim 1, further comprising:
   sending, from the source system to the replica system, an additional update message based on the portion of the first file being modified;
   assigning, at the replica system, based on the additional update message, an additional extent on the replica system to a portion of the replica of the first file that corresponds to the portion of the first file; and
   updating, at the replica system, metadata associated with the replica of the first file to indicate that an initial portion of the replica of the first file is associated with the address of the second extent up to the given block offset and that the portion of the replica of the first file is associated with an address of the additional extent.

5. The method of claim 4, further comprising:
   setting, at the source system, a reference count associated with a portion of the first extent beginning at the given block offset to one; and
   setting, at the source system, a reference count associated with the separate extent to one.

6. The method of claim 5, further comprising:
   setting, at the replica system, a reference count associated with a portion of the second extent beginning at the given block offset to one; and
   setting, at the replica system, a reference count associated with the additional extent to one.

7. The method of claim 1, further comprising:
   determining, at the source system, that the first file has been deleted;
   changing, at the source system, the status of the first extent from cloned to non-cloned;
   sending, from the source system to the replica system, an additional update message comprising an address of the first extent on the source system and an indication that the status of the first extent has changed from cloned to non-cloned;
   changing, at the replica system, based on the additional update message, the status of the second extent from cloned to non-cloned; and
   deleting, at the replica system, the replica of the first file.

8. A system comprising:
   one or more processors; and
   a non-transitory computer-readable medium storing instructions executable by the one or more processors to cause the system to perform operations comprising:
      determining, at a source system in a storage replication environment, that a first file on the source system has been cloned to create a second file on the source system;
      changing, at the source system, a status of a first extent associated with the first file from non-cloned to cloned;
      sending, from the source system to a replica system in the storage replication environment, an update message comprising an address of the first extent on the source system and an indication that the status of the first extent has changed from non-cloned to cloned, the address of the first extent acting as a token;

changing, at the replica system, based on the update message, a status of a second extent associated with a replica of the first file on the replica system from non-cloned to cloned;

creating, at the replica system, based on the update message, a mapping of the address of the first extent on the source system to an address of the second extent on the replica system;

replacing the token with the address of the second extent utilizing the mapping;

creating, at the replica system, based on the mapping, a replica of the second file comprising a reference to the address of the second extent on the replica system;

determining, at the source system, that a portion of the first file has been modified, wherein the portion of the first file begins at a given block offset;

assigning, at the source system, a separate extent on the source system to the portion of the first file; and updating, at the source system, metadata associated with the first file to indicate that an initial portion of the first file is associated with the address of the first extent up to the given block offset and that the portion of the first file is associated with an address of the separate extent.

9. The system of claim 8, the operations further comprising:

setting, at the source system, based on the second file being created, a reference count associated with the first extent to two; and setting, at the replica system, based on the replica of the second file being created, a reference count associated with the second extent to two.

10. The system of claim 8, wherein:

the address of the first extent comprises a storage address of the first extent on the source system corresponding to a location of the first file; and the address of the second extent comprises a storage address of the second extent on the replica system corresponding to a location of the replica of the first file.

11. The system of claim 8, the operations further comprising:

sending, from the source system to the replica system, an additional update message based on the portion of the first file being modified;

assigning, at the replica system, based on the additional update message, an additional extent on the replica system to a portion of the replica of the first file that corresponds to the portion of the first file; and updating, at the replica system, metadata associated with the replica of the first file to indicate that an initial portion of the replica of the first file is associated with the address of the second extent up to the given block offset and that the portion of the replica of the first file is associated with an address of the additional extent.

12. The system of claim 11, the operations further comprising:

setting, at the source system, a reference count associated with a portion of the first extent beginning at the given block offset to one; and setting, at the source system, a reference count associated with the separate extent to one.

13. The system of claim 12, the operations further comprising:

setting, at the replica system, a reference count associated with a portion of the second extent beginning at the given block offset to one; and setting, at the replica system, a reference count associated with the additional extent to one.

14. The system of claim 8, the operations further comprising:

determining, at the source system, that the first file has been deleted;

changing, at the source system, the status of the first extent from cloned to non-cloned;

sending, from the source system to the replica system, an additional update message comprising an address of the first extent on the source system and an indication that the status of the first extent has changed from cloned to non-cloned;

changing, at the replica system, based on the additional update message, the status of the second extent from cloned to non-cloned; and deleting, at the replica system, the replica of the first file.

15. A non-transitory computer-readable medium storing instructions that, when executed by one or more processors of a computing system, cause the computing system to perform operations comprising:

determining, at a source system in a storage replication environment, that a first file on the source system has been cloned to create a second file on the source system;

changing, at the source system, a status of a first extent associated with the first file from non-cloned to cloned, the address of the first extent acting as a token;

sending, from the source system to a replica system in the storage replication environment, an update message comprising an address of the first extent on the source system and an indication that the status of the first extent has changed from non-cloned to cloned;

changing, at the replica system, based on the update message, a status of a second extent associated with a replica of the first file on the replica system from non-cloned to cloned;

creating, at the replica system, based on the update message, a mapping of the address of the first extent on the source system to an address of the second extent on the replica system;

replacing the token with the address of the second extent utilizing the mapping;

creating, at the replica system, based on the mapping, a replica of the second file comprising a reference to the address of the second extent on the replica system;

determining, at the source system, that a portion of the first file has been modified, wherein the portion of the first file begins at a given block offset;

assigning, at the source system, a separate extent on the source system to the portion of the first file; and updating, at the source system, metadata associated with the first file to indicate that an initial portion of the first file is associated with the address of the first extent up to the given block offset and that the portion of the first file is associated with an address of the separate extent.

16. The non-transitory computer-readable medium of claim 15, the operations further comprising:

setting, at the source system, based on the second file being created, a reference count associated with the first extent to two; and setting, at the replica system, based on the replica of the second file being created, a reference count associated with the second extent to two.

17. The non-transitory computer-readable medium of claim 15, wherein:
the address of the first extent comprises a storage address of the first extent on the source system corresponding to a location of the first file; and
the address of the second extent comprises a storage address of the second extent on the replica system corresponding to a location of the replica of the first file.

18. The non-transitory computer-readable medium of claim 15, the operations further comprising:
sending, from the source system to the replica system, an additional update message based on the portion of the first file being modified;
assigning, at the replica system, based on the additional update message, an additional extent on the replica system to a portion of the replica of the first file that corresponds to the portion of the first file; and
updating, at the replica system, metadata associated with the replica of the first file to indicate that an initial portion of the replica of the first file is associated with the address of the second extent up to the given block offset and that the portion of the replica of the first file is associated with an address of the additional extent.

19. The non-transitory computer-readable medium of claim 18, the operations further comprising:
setting, at the source system, a reference count associated with a portion of the first extent beginning at the given block offset to one; and
setting, at the source system, a reference count associated with the separate extent to one.

20. The non-transitory computer-readable medium of claim 19, the operations further comprising:
setting, at the replica system, a reference count associated with a portion of the second extent beginning at the given block offset to one; and
setting, at the replica system, a reference count associated with the additional extent to one.

21. The non-transitory computer-readable medium of claim 15, the operations further comprising:
determining, at the source system, that the first file has been deleted;
changing, at the source system, the status of the first extent from cloned to non-cloned;
sending, from the source system to the replica system, an additional update message comprising an address of the first extent on the source system and an indication that the status of the first extent has changed from cloned to non-cloned;
changing, at the replica system, based on the additional update message, the status of the second extent from cloned to non-cloned; and
deleting, at the replica system, the replica of the first file.

* * * * *